US008874890B2

United States Patent
Wu et al.

(10) Patent No.: US 8,874,890 B2
(45) Date of Patent: Oct. 28, 2014

(54) SERVER WITH PLURALITY OF NETWORK CARDS WITH REMOTE RESTARTING AND WAKE-UP FUNCTIONALITY

(75) Inventors: Kang Wu, Shenzhen (CN); Bo Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 216 days.

(21) Appl. No.: 13/570,235

(22) Filed: Aug. 8, 2012

(65) Prior Publication Data

US 2013/0054953 A1    Feb. 28, 2013

(30) Foreign Application Priority Data

Aug. 23, 2011   (CN) .......................... 2011 1 0242819

(51) Int. Cl.
  *G06F 9/00*    (2006.01)
  *G06F 15/177*  (2006.01)
  *G06F 1/32*    (2006.01)
  *G06F 9/44*    (2006.01)

(52) U.S. Cl.
  CPC ............ *G06F 15/177* (2013.01); *G06F 1/32* (2013.01); *G06F 9/4416* (2013.01)
  USPC ........................................................ 713/2; 713/1

(58) Field of Classification Search
  CPC ............................. G06F 15/177; G06F 9/00
  USPC ....................................................... 713/2
  See application file for complete search history.

(56) References Cited

U.S. PATENT DOCUMENTS

| 6,871,300 B1 * | 3/2005 | Irving ...................... 714/47.3 |
| 2005/0060529 A1 * | 3/2005 | Chen ............................ 713/2 |
| 2009/0307340 A1 * | 12/2009 | Haneefa et al. ............ 709/222 |

* cited by examiner

*Primary Examiner* — Thomas Lee
*Assistant Examiner* — Terrell Johnson
(74) *Attorney, Agent, or Firm* — Novak Druce Connolly Bove + Quigg LLP

(57) ABSTRACT

A server includes a number of first and second network cards, a buffer, a restart circuit, an AND gate, and a south bridge. Each of the first network cards includes a first signal pin to transmit a wake-up signal and a restart signal. Each of the second network cards includes a second signal pin to transmit a wake-up signal. The restart circuit is connected to each of the first signal pins through the buffer to receive the restart signal, and reboots the server according to the restart signal. The south bridge is connected to each of the first and second signal pins through the AND gate to receive the wake-up signal, and wakes up the server according to the wake-up signal.

7 Claims, 1 Drawing Sheet

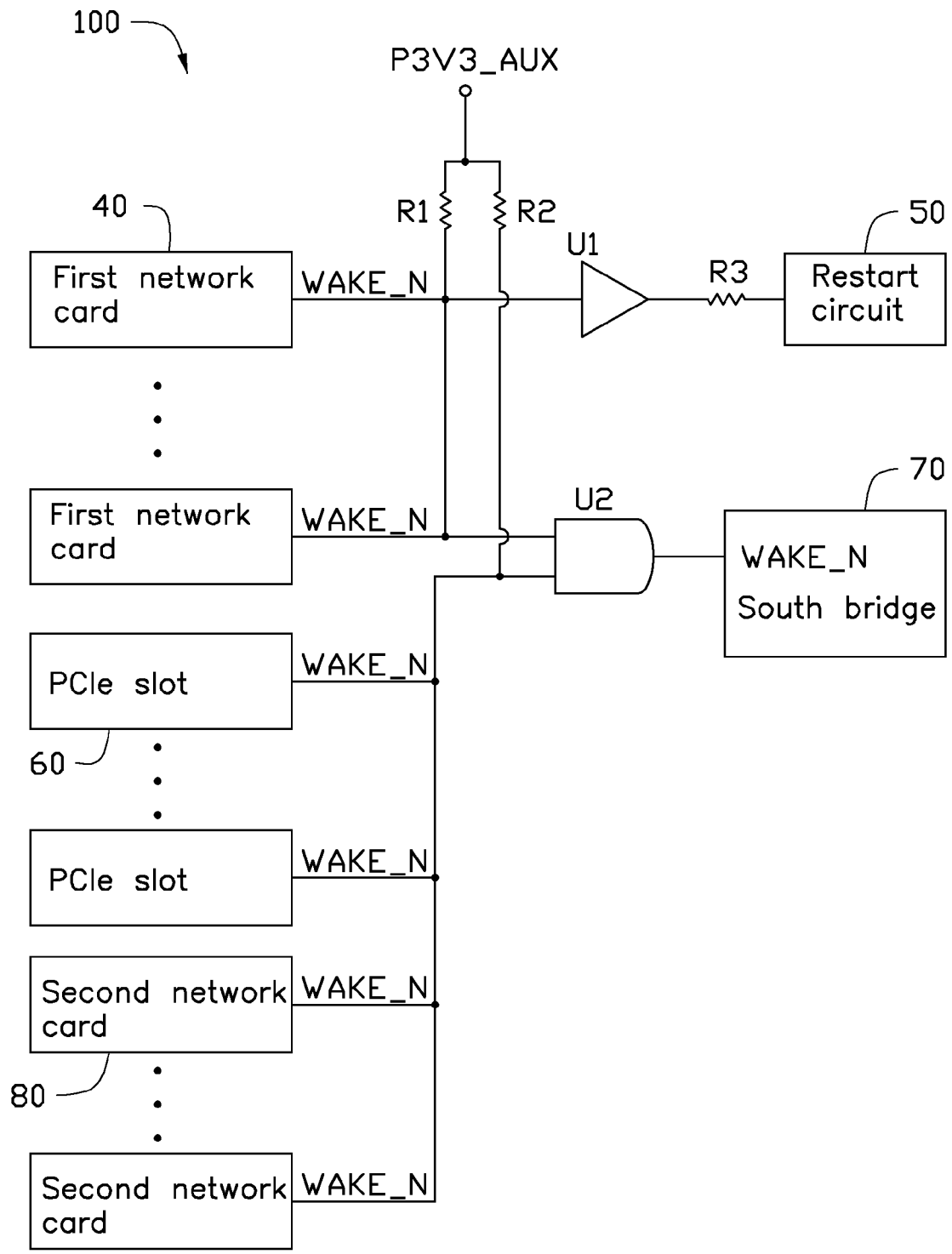

SERVER WITH PLURALITY OF NETWORK CARDS WITH REMOTE RESTARTING AND WAKE-UP FUNCTIONALITY

BACKGROUND

1. Technical Field

The present disclosure relates to servers, and more particularly to a server with remote reboot and wake-up function.

2. Description of Related Art

Some servers include components, such as network cards and peripheral component interconnection express (PCIe) slots, with a remote wake-up function. Each component includes a signal pin to transmit a wake-up signal. The signal pins of components of a server are connected together. However, some of the components further include a remote reboot function, and the signal pins are also used to transmit a restart signal. If a signal pin of a component without the remote reboot function receives the restart signal, the component will not identify the restart signal and will send out the wrong instruction. Therefore, reliability of the server is affected.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the view.

The FIGURE is a circuit diagram of a server in accordance with an exemplary embodiment of the present disclosure.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean at least one.

The FIGURE is an exemplary embodiment of a server 100 including a plurality of first network cards 40, a plurality of peripheral component interconnection express (PCIe) slots 60, a plurality of second network cards 80, a buffer U1, an AND gate U2, a restart circuit 50, a south bridge 70, and three resistors R1-R3. In one embodiment, each of the first network cards 40 includes a remote wake-up function and a remote reboot function, and each of the PCIe slots 60 and the second network cards 80 includes the remote wake-up function. Each of the first network cards 40 and second network cards 80 can be integrated in a motherboard of the server 100, or connected to the motherboard of the server 100 through a connector, such as a PCIe slot. Each of the (PCIe) slots 60 can receive a peripheral component, such as a display card, or a sound card, or a network card.

Each of the first network cards 40 includes a signal pin WAKE_N to transmit a wake-up signal and a restart signal. Each of the second network cards 80 includes a signal pin WAKE_N to transmit a wake-up signal. Each of the PCIe slots 60 includes a signal pin WAKE_N to transmit signals. The south bridge 70 includes a signal pin WAKE_N to receive the wake-up signal. An input terminal of the buffer U1 is connected to the signal pin WAKE_N of each of the first network cards 40 to receive the restart signal, and connected to a power supply P3V3_AUX through the resistor R1. An output terminal of the buffer U1 is connected to the restart circuit 50 through the resistor R3, to output the restart signal to the restart circuit 50. A first input terminal of the AND gate U2 is connected to the signal pin WAKE_N of each of the first network cards 40 to receive the wake-up signal. A second input terminal of the AND gate U2 is connected to the signal pin WAKE_N of each of the second network cards 80 to receive the wake-up signal, connected to the signal pin WAKE_N of each of the PCIe slots 60 to receive signals, and further connected to the power supply P3V3_AUX through the resistor R2. An output terminal of the AND gate U2 is connected to the signal pin WAKE_N of the south bridge 70, to output the wake-up signal to the south bridge 70. It may be understood that each of the wake-up and the restart signal is a low level signal.

The restart circuit 50 is used to reboot the server 100 according to the restart signal received from the output terminal of the buffer U1. The south bridge 70 is used to wake up the server 100 according to the wake-up signal received from the output terminal of the AND gate U2. The restart circuit 50 falls within well-known technologies, and is therefore not described here.

When the server 100 is in a power on state (that is S0 state), the restart circuit 50 operates. The first network cards 40 receive a restart signal from a remote control terminal through a network. The signal pin WAKE_N of each of the first network cards 40 outputs the restart signal to the restart circuit 50 through the buffer U1 and the resistor R3, after each of the first network cards 40 identifies the restart signal. The restart circuit 50 reboots the server 100 according to the restart signal received from the output terminal of the buffer U1. It may be understood that the remote control terminal can monitor work states, such as a power on state, a sleep state, and a power off state, of the server 100 through the network, and can transmit a control signal, such as a restart signal or a wake-up signal, to the server 100, according to a corresponding work state of the server 100.

When the server 100 is in a sleep state (that is S3 state) or a power off state (that is S5 state), the restart circuit 50 does not operate. The first network cards 40, the PCIe slots 60 and the second network cards 80 receive a wake-up signal from the remote control terminal through the network. The signal pin WAKE_N of each of the first network cards 40 outputs the wake-up signal to the first input terminal of the AND gate U2, after the first network cards 40 identify the wake-up signal. The signal pin WAKE_N of each of the second network cards 80 outputs the wake-up signal to the second input terminal of the AND gate U2, after the second network cards 80 identify the wake-up signal. The output terminal of the AND gate U2 outputs the wake-up signal to the signal pin WAKE_N of the south bridge 70. The south bridge 70 wakes up the server 100 according to the wake-up signal received from the output terminal of the AND gate U2.

When each of the PCIe slots 60 houses a first peripheral component, such as a first network card 40 or a second network card 80, the signal pin WAKE_N of each of the PCIe slots 60 outputs the wake-up signal to the second input terminal of the AND gate U2, after the first peripheral component identifies the wake-up signal. The output terminal of the AND gate U2 outputs the wake-up signal to the south bridge 70. When each of the PCIe slots 60 houses a second peripheral component, such as a display card or a sound card, the signal pin WAKE_N of each of the PCIe slots 60 outputs another signal, such as a high level signal, to the second input terminal of the AND gate U2, after the second peripheral component cannot identify the wake-up signal. The output terminal of the AND gate U2 outputs the wake-up signal to the signal pin WAKE_N of the south bridge 70, since the first input terminal of the AND gate U2 receives the wake-up signal from the first network cards 40, the second input terminal of the AND gate U2 receives the wake-up signal from the second network cards 80, and the wake-up signal is a low level signal. When there is no peripheral component housed in each of the PCIe slots 60, the second input terminal of the AND gate U2 receives no signal from the signal pin WAKE_N of each of the PCIe slots 60. The output terminal of the AND gate U2 outputs the wake-up signal to the signal pin WAKE_N of the south bridge 70, since the first input terminal of the AND gate U2 receives the wake-up signal from the first network cards 40, and the second input terminal of the AND gate U2 receives the wake-up signal from the second network cards 80. That is, the output terminal of the AND gate U2 outputting the wake-up signal to the south bridge 70 has no relation with the peripheral components received in the PCIe slots 60 and the signal output from the signal pin WAKE_N of each of the PCIe slots 60. Therefore, even if each of the PCIe slots 60 output a high level signal to the second input terminal of the AND gate U2, the server 100 can be waked up normally.

As detailed above, the south bridge 70 receives the wake-up signal from the first network cards 40 and the second network slots 80, to wake up the server 100. The restart circuit 50 receives the restart signal from the first network cards 40, to reboot the server 100. Therefore, the server 100 is stable.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A server, comprising:
   first and second resistors;
   a plurality of first network cards, wherein each of the first network cards has a remote wake-up function and a remote reboot function, and comprises a first signal pin to transmit a wake-up signal and a restart signal, each of the first signal pins is connected to a power supply through the first resistor;
   a plurality of second network cards, wherein each of the second network cards has a remote wake-up function, and comprises a second signal pin to transmit a wake-up signal, each of the second signal pins is connected to the power supply through the second resistor;
   a buffer comprising an input terminal connected to each of the first signal pins to receive the restart signal, and an output terminal to output the restart signal;
   a restart circuit connected to the output terminal of the buffer to receive the restart signal, wherein the restart circuit reboots the server according to the restart signal;
   an AND gate comprising a first input terminal connected to each of the first signal pins to receive the wake-up signal from the first network cards, a second input terminal connected to each of the second signal pins to receive the wake-up signal from the second network cards, and an output terminal to output the wake-up signal; and
   a south bridge comprising a third signal pin connected to the output terminal of the AND gate to receive the wake-up signal, wherein the south bridge wakes up the server according to the wake-up signal.

2. The server of claim 1, further comprising a plurality of peripheral component interconnection express (PCIe) slots, wherein each of the PCIe slots has a remote wake-up function and comprises a fourth signal pin, each of the fourth signal pins is connected to the power supply through the second resistor, and connected to the second input terminal of the AND gate.

3. The server of claim 1, wherein each of the wake-up signal and the restart signal is a low level signal.

4. The server of claim 1, further comprising a third resistor, wherein the output terminal of the buffer is connected to the restart circuit through the third resistor.

5. A server, comprising:
   first and second resistors;
   a plurality of first network cards, wherein each of the first network cards has a remote wake-up function and a remote reboot function, and comprises a first signal pin to transmit a wake-up signal and a restart signal, each of the first signal pins is connected to a power supply through the first resistor;
   a plurality of peripheral component interconnection express (PCIe) slots, wherein each of the PCIe slots has a remote wake-up function, and comprises a second signal pin, each of the second signal pins is connected to the power supply through the second resistor;
   a buffer comprising an input terminal connected to each of the first signal pins to receive the restart signal, and an output terminal to output the restart signal;
   a restart circuit connected to the output terminal of the buffer to receive the restart signal, wherein the restart circuit reboots the server according to the restart signal;
   an AND gate comprising a first input terminal connected to each of the first signal pins to receive the wake-up signal from the first network cards, a second input terminal connected to each of the second signal pins, and an output terminal to output the wake-up signal; and
   a south bridge comprising a third signal pin connected to the output terminal of the AND gate to receive the wake-up signal, wherein the south bridge wakes up the server according to the wake-up signal.

6. The server of claim 5, wherein each of the wake-up signal and the restart signal is a low level signal.

7. The server of claim 5, further comprising a third resistor, wherein the output terminal of the buffer is connected to the restart circuit through the third resistor.

* * * * *